United States Patent [19]
Lamminen et al.

[11] Patent Number: 5,498,329
[45] Date of Patent: Mar. 12, 1996

[54] VEHICLE WASH APPARATUS USING RECLAIMED WATER

[75] Inventors: Olli Lamminen; P. Mikael Kaipainen, both of Ann Arbor, Mich.

[73] Assignee: Interclean Equipment, Inc., Ann Arbor, Mich.

[21] Appl. No.: 304,115

[22] Filed: Sep. 12, 1994

[51] Int. Cl.⁶ .......................... B01D 17/12; B01D 17/038
[52] U.S. Cl. .................. 210/86; 15/DIG. 2; 134/123; 210/104; 210/137; 210/167; 210/258; 210/259; 210/512.2
[58] Field of Search .................. 15/DIG. 2; 134/111, 134/123; 210/86, 97, 104, 110, 167, 194, 195.1, 257.1, 258, 259, 512.1, 512.2, 532.1, 137, 534

[56] References Cited

U.S. PATENT DOCUMENTS

| | | | |
|---|---|---|---|
| 2,717,695 | 9/1955 | Martin | 210/512.1 |
| 2,922,173 | 1/1960 | Lind et al. | 134/123 |
| 2,967,618 | 1/1961 | Vane | 210/512.1 |
| 3,378,018 | 4/1968 | Lawter | 134/123 |
| 3,444,077 | 5/1969 | Finch | 210/512.1 |
| 3,502,215 | 3/1970 | Cahan | 134/123 |
| 4,029,114 | 6/1977 | Wiltrout | 134/123 |
| 4,168,231 | 9/1979 | Allen et al. | 210/167 |
| 4,414,112 | 11/1983 | Simpson et al. | 210/512.1 |
| 4,652,368 | 3/1987 | Ennis et al. | 210/167 |
| 5,020,556 | 6/1991 | Lamminen et al. | 134/112 |
| 5,245,725 | 9/1993 | Lamminen | 15/53.3 |
| 5,374,352 | 12/1994 | Pattee | 134/123 |

FOREIGN PATENT DOCUMENTS

| | | | |
|---|---|---|---|
| 1386572 | 4/1988 | U.S.S.R. | 210/512.1 |

*Primary Examiner*—Joseph W. Drodge
*Attorney, Agent, or Firm*—Harness, Dickey & Pierce

[57] ABSTRACT

An apparatus is provided for cleaning vehicles which utilizes recirculated wash water to clean a vehicle, thereby saving water and expense in operation. The apparatus utilizes a clarifier tank which receives partially clarified water under pressure from a sump pump to produce a swirling flow of water within the tank which separates sediment centrifugally outwardly in the tank where it drops in a swirling path due to gravity and is collected in a conical base portion of the tank for expulsion therefrom. Clarified water is drawn out from the tank from an upper central portion therein. Preferably, a settling pit is used to partially clarify the water before it enters the clarifying tank. Furthermore, a pre-filter such as a cyclone separator is also utilized to pre-filter wash water before it is clarified in the clarifying tank. The drawn off clarified water from the clarifying tank is then pumped to a plurality of washing nozzles which assists in washing a vehicle passing through the apparatus.

8 Claims, 2 Drawing Sheets

VEHICLE WASH APPARATUS USING RECLAIMED WATER

BACKGROUND AND SUMMARY OF THE INVENTION

The present invention relates to a vehicle washing apparatus and in particular to a vehicle washing apparatus employed for reclaiming and clarifying recirculated wash water while cleaning a vehicle.

It is common for a vehicle wash apparatus to include a combination of moving or rotating brushes and high pressure spray nozzles to remove dirt and debris from a vehicle. The brushes physically contact surfaces of a vehicle to scrub and remove dirt and debris therefrom. The nozzles utilize a high pressure water spray to clean other surfaces of a vehicle, particularly delicate surfaces which are susceptible to damage from rotating brushes. For example, brushes can cause damage to windows on buses which are commonly made of plastics such as DuPont Lucite or General Electric Lexan. Furthermore, a need has arisen to recirculate wash water in a wash vehicle apparatus in order to conserve water, thereby saving vehicle cleaning costs. However, recirculation of dirt and sediment collected during a wash cycle can damage a vehicle when recirculated through a brush system or a spray nozzle.

Introduction of recirculated soot and particles through a rotating wash brush can cause significant damage to a vehicle body and especially a painted surface. Likewise, high pressure water nozzles use high pressure water flow therefrom to loosen and dislodge debris and particulate while cleaning a vehicle surface which can damage the surface. The recirculated dirt and sediment is propelled at a vehicle surface along with the water under high velocity and can actually sand blast and pit a surface.

It is an object of the present invention to provide a vehicle wash apparatus which effectively cleans and clarifies recirculated wash water which is then re-used by the vehicle wash apparatus in a subsequent cleaning cycle in a manner which does not damage a vehicle surface.

It is a feature of the present invention that a clarifying tank separates solids from recirculated wash water by swirling the water in the tank in response to inlet water flow which creates centrifugal forces which in conjunction with gravity separates the solids from clarified water located centrally in the tank. Preferably, a separate cyclone separator pre-filters wash water before it is introduced into the clarifier tank. Wash water is first reclaimed from a central settling pit in a vehicle wash apparatus by drawing it with a sump pump and feeding it to the cyclone separator for pre-separation. The cyclone separate draws off purged solids which are delivered to the settling tank. Subsequently, the pre-separated wash water is introduced into the clarifying tank where it is further separated, purging solids which are delivered to the bottom of the settling pit. A high pressure pump thereafter draws clarified water from the clarifier tank which is introduced into wash stations in the vehicle wash apparatus.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
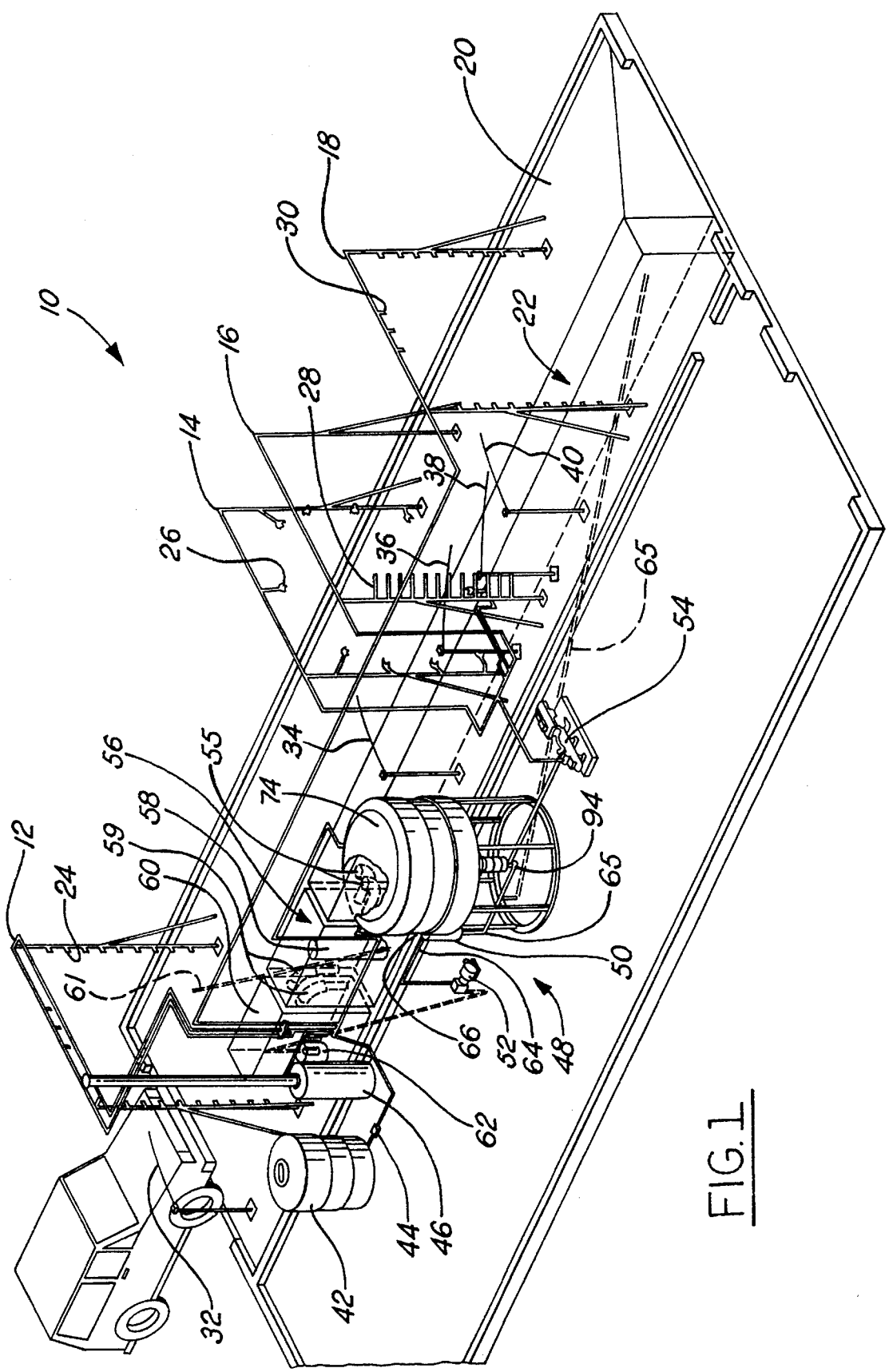
FIG. 1 is a perspective view showing the vehicle wash apparatus of this invention with a vehicle beginning to pass therethrough.
Figure 2:
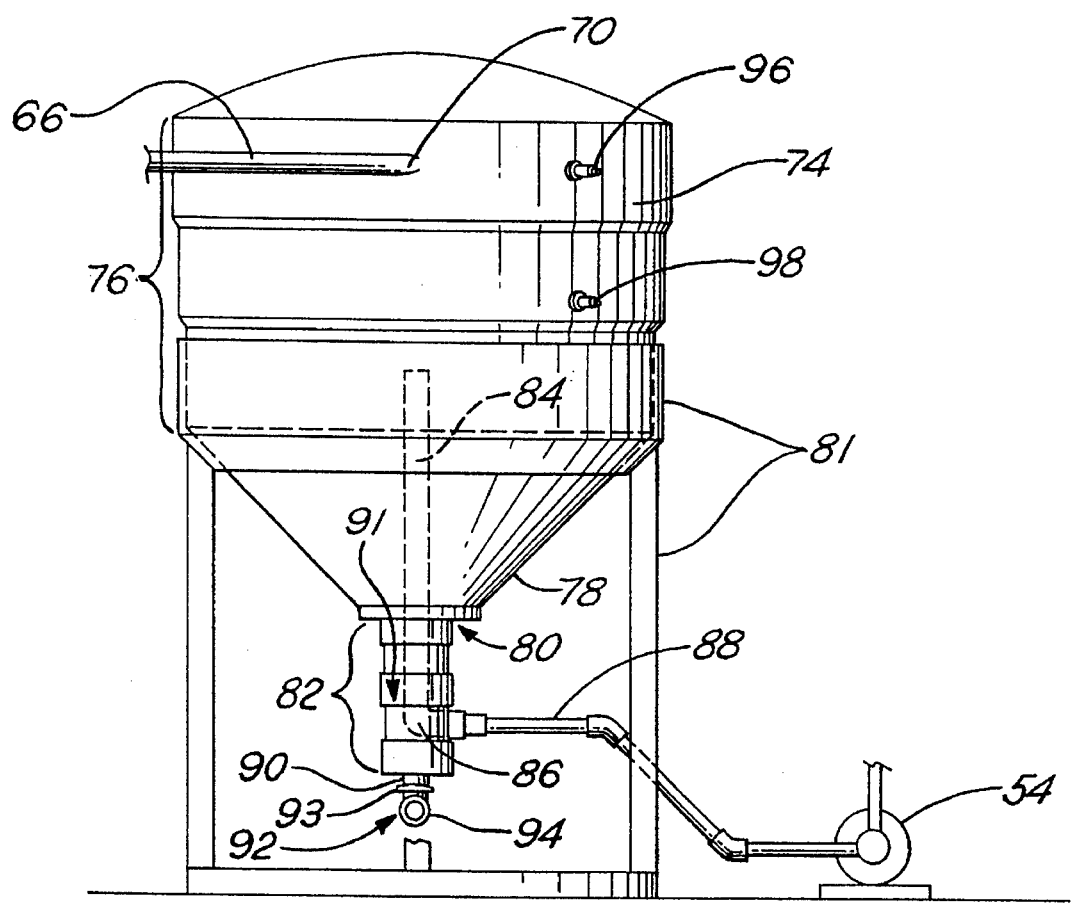
FIG. 2 is an elevational view of a clarifier tank and support stand incorporated in the vehicle wash apparatus of this invention.
Figure 3:
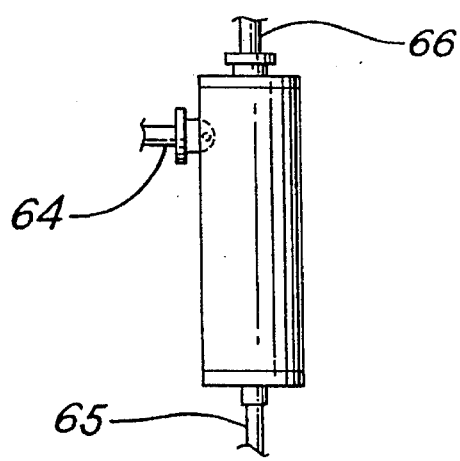
FIG. 3 is an elevational view of a cyclone separator incorporated in the vehicle wash apparatus of this invention.

The vehicle wash apparatus of this invention, containing an apparatus for clarifying recirculated wash water, is shown in FIG. 1 and designated generally at 10. Apparatus 10 includes a plurality of vehicle wash stations consisting of a detergent arch 12, a spinner arch 14, a rear wash arch 16, and a final rinse arch 18. Each of these arches is provided with fluid flow nozzles for spraying solutions of either detergent wash water or rinse water. The arches 12–18 are supported and arranged to allow through passage of a vehicle while it is being cleaned. Each arch is retained to a sloped drainage floor 20 which descends into a corresponding longitudinal settling pit 22 for collecting wash water deposited on the drainage floor during a vehicle wash cycle. Preferably, the pit and sloped drainage floor are covered with steel grating (not shown) on which a vehicle travels through the apparatus 10. A motor vehicle, preferably a bus or large truck enters the vehicle wash apparatus adjacent the detergent arch 12 through which it passes as a chemical, or soapy, cleaning solution is applied to the vehicle with an array of spray nozzles 24 suspended from the arch. Subsequently, the vehicle is first passed through the spinner arch 14 and then the rear wash arch 16 which each clean the vehicle with high pressure nozzles that apply re-circulated wash water to clean the vehicle further as high pressure water exits the nozzles. Finally, clean fresh rinse water is applied through nozzles 30 which rinses cleaning solution from the vehicle.

Preferably, a vehicle such as a bus is operator driven through the vehicle wash apparatus 10 while the vehicle is being cleaned. Alternatively, a conveyor system can be utilized to transport a vehicle through the apparatus. To conserve use of cleaning and rinse water when utilizing apparatus 10, each arch is provided with a vehicle sensing wand 32–40 which detects the position of a vehicle to trigger application of cleaning solution or water through each respective arch while the vehicle is present within the arch. For example, wand 32 is provided upstream of the detergent arch 12 such that a vehicle displaces wand 32 as it enters the arch, and the rear end of the vehicle upon clearing the wand 32 triggers the arch to subsequently stop the spraying of detergent on the vehicle after it has passed through the arch. Likewise, wand 34 triggers start up of spinner arch 14 and subsequent termination of the arch operation via spinner nozzles 26 subsequent to the vehicle passing by wand 34. Wand 36 triggers start-up of rear wash arch 16 and wand 38 monitors the shut-off of rear wash arch 16. Finally, wand 40 detects start-up of final rinse arch 18 as well as shut-off of same.

When a vehicle passes through the first stage of a wash cycle, soapy cleaning solution is applied through the spray nozzles 24 provided along the detergent arch 12. A chemical tank 42 stores a chemical cleaning solution which is delivered when needed by a detergent pump 44 that further joins a supply line from a water heater 46 to supply a hot water and detergent mix to detergent arch 12 for pressure spraying through spray nozzles 24 onto a vehicle thereunder. Water heater 46 also supplies hot water through separate parallel flow tubes interconnected with valves to supply clean fresh water to detergent arch 12 and final rinse arch 18. Likewise, water heater 46 provides fresh water to a clarifier tank assembly 48 to fill the tank after it has been cleaned out, or to supply water to the wash arches immediately after start-up of the apparatus 10 but prior to onset of a complete recirculation cycle.

The clarifier tank assembly 48 receives recirculated wash water from a cyclone separator 50 which functions as a first stage cleaner for feeding partially clarified water into the clarifier tank assembly. Clarifier tank assembly 48 functions as a second stage cleaner which receives pre-filtered wash water from the cyclone separator 50. Preferably, the cyclone separator 50 is a purchased item commercially available from several manufacturers such as Lakos or Griswald. Alternatively, a screen or membrane-type filter can be utilized in place of separator 50.

During operation of the vehicle wash apparatus 10, detergent wash water and rinse water is collected in the sloped drainage floor 20 where it drains into a settling pit 22. Large particles of debris and dirt settle to the bottom of pit 22 leaving partially clarified water in the upper portion of the settling pit. A secondary settling pit receives the partially clarified water from settling pit 22 through a pair of upturned discharge pipes 55 which transfer water from the upper regions of the settling pit 22 into secondary settling pit 56. Further settling occurs in pit 56 before water is transferred through a pair of downturned discharge pipes 59 into a tertiary settling pit 60. Secondary settling pit 56 also has an overflow tube therein which regulates the maximum water level in each of the three settling pits 22, 56, and 60. Water cascades into an overflow tube 58 when the tanks reach a threshold water level which discharges water into the tube and carries water from the base of the tube out to a drainage pipe or sewer (not shown) through a drainage pipe 61. A foot valve and intake screen 62 is provided in the base of tertiary pit 60 for drawing off water which has been successively cleaned in each of the settling pits. A sump pump 52 draws water through the foot valve via the intake screen 62 which additionally prevents debris from entering the supply pipe before it is pumped into the cyclone separator 50 through a cyclone inlet 64.

The cyclone separator 50 receives recirculated wash water through a cyclone inlet 64 which defines a tangentially oriented inlet nozzle along the cyclone separator's circumferential inner surface. High speed water exits from inlet 64 which induces swirling and rotating fluid flow within the separator that produces centrifugal forces which cooperate with gravitational forces to spin and deposit sediment in the base of the separator. The centrifugally and gravitationally collected sediment is then expelled through the lower cyclone outlet which joins with a solid purge line 65 for delivering sediment to the settling pit 22. A cyclone outlet 66 is provided on top of the cyclone separator for drawing off clarified water from within the top portion of the separator. The clarified water is subsequently forced into the clarifier tank assembly 48 through a tangentially arranged inlet 70 which produces swirling flow therein. Water is forced into the clarifier tank assembly through the inlet 70 under high pressure which is provided by sump pump 52 as it forces water through the cyclone separator 50.

The clarifier tank assembly 48 includes a clarifier tank 74 having a stepped-down cylindrical top portion 76 and a conical base 78 terminating in an end flow outlet 80. A conical support sleeve and stand 81 form a support structure which receives the tank conical base 78 to support the clarifying tank in an upright position. A flow outlet fitting 82 is sealingly fitted to the flow outlet 80 for drawing off clarified water as well as solids which settle within the bottom of the tank. A central tube inlet 84 extends vertically within the fitting 82 into the center of the clarifier tank 74, forming an inlet elevated above the top-most portion of the conical base 78. The tube inlet 84 terminates in an elbow fitting 86 at its lower base end where it exits the outlet fitting through a fill line 88. Clarified water is drawn through the tube inlet from the central portion of the clarifier tank 74 where it travels through elbow 86 and exits through the fill line 88. A coaxial space 91 is formed in fitting 82 about the tube inlet 84 and elbow 86 through which sediment collects from the conical base 78 as it drops due to gravity from the outer circumferential portions of the tank along which it is spun by centrifugal force. The collected sediment is then either with slow, continuous flow or periodically expelled through a solids purge fitting 90. The solids purge fitting 90 includes an elbow 92 and a ball cock 93. Preferably, the ball cock is intermittently opened in a timed and periodic manner during operation to periodically discharge sediment and solids collected in the clarifier tank 74. The ball cock 93 which extends from the solids purge fitting 90 connects directly with the solids purge line 65 through a purge line 94 such that sediment collected therein passes through line 94 into line 65 where it is delivered into the settling pit 22 where it settles to the bottom. Alternatively, ball cock 93 can be intermittently manually operated by an operator in order to expel solids collected in the clarifier tank 74 or left partially open to allow slow, constant flow.

Recirculated wash water is delivered to the cyclone separator 50 and clarifier tank 74 via sump pump 52 in a regulated manner in order to maintain recirculated water levels within the clarifier tank 74 between a desired minimum and maximum level. A high water level sensor 96 is provided at an upper level of the clarifier tank 74 and a low water level sensor 98 is provided therebelow for sensing a threshold high and threshold low level, respectively, which is used to determine when to start up and shut off sump pump 52 in order to deliver further recirculated water to the separator and tank. Clarified water is drawn out of the clarifier tank 74 by a high pressure pump which delivers the water to high pressure arch 14 and rear wash arch 16.

In operation, wash water is settled in the three settling pits 22, 56, and 60 during a complete vehicle wash cycle performed in apparatus 10. The settled out and partially clarified water is drawn out through foot valve and intake screen 62 where it is further filtered by the screen and drawn by sump pump 52 into the first stage cyclone separator 50. Rapid forceful introduction of such recycled wash water is produced by forcibly pumping such water into the cyclone separator through the cyclone inlet at a tangential angle to produce swirling water within the separator. Centrifugal forces are thereby created in the separator which tends to force particles suspended in the water radially outwardly where they spin and drop down due to gravity, and are collected in the base of the separator for expulsion through cyclone outlet 66 and eventually transfer through solids purge line 65 into settling pit 22. Clarified water leaves the cyclone separator 50 at high speed and pressure as a result of internal water pressure imparted by operation of sump pump 52. Partially clarified water which is forced through the cyclone separator 50 exits through cyclone outlet 66 and forcibly enters the clarifier tank 74 through its tangential inlet 70 at such a high pressure that water entering the clarifier tank 74 is swirled therein to create centrifugal forces which tangentially outwardly expel solids and contaminants which are further gravitationally collected in the tank's conical base 78 for discharge through the outlet fitting 82.

It is to be understood that the invention is not limited to the exact construction illustrated and described above, but that various changes and modifications may be made without departing from the spirit and scope of the invention as defined in the following claims.

We claim:

1. Vehicle wash system comprising:

a settling pit arranged for receiving and collecting therein wash water and solids removed from a vehicle;

separator means for at least partially separating the solids from the wash water, said separator means having an inlet for receiving the wash water from said settling pit, a water outlet through which the at least partially cleaned wash water is discharged from said separator means and a solids outlet through which solids separated from the water are discharged;

first pump means for selectively withdrawing the wash water from said settling pit and pumping the wash water into and through said separator means;

a clarifier tank having an upper portion, an inlet in said upper portion in communication with said separator means water outlet whereby water pumped through said separator means by said pump means is received into said tank, said inlet directing wash water in a substantially tangential direction within said tank, said tank further having a conically tapered base portion beneath said upper portion, said base portion providing an outlet at a bottom end thereof;

an outlet fitting provided in sealing engagement with said tank outlet, said fitting coaxially supporting an outlet tube therein which extends vertically upward through said bottom end of said tank and having an open end for receiving cleaned water from an elevated central portion of said tank, said outlet tube further mating with a fill line for expelling cleaned water therethrough from said tank;

a solids purge tube provided in a base portion of said outlet fitting through which solids in the wash water are removed from said tank;

flow regulating means for providing a continuous flow of wash water and solids from said tank through said solids purge tube whereby the solids are not permitted to accumulate in said outlet fitting or tank base portion;

second pump means for drawing cleaned water from said tank through said outlet tube;

spray means for receiving the cleaned water from said second pump means and delivering the cleaned water to a vehicle to be washed whereby said clarifier tank serves as a reservoir for cleaned water to be used washing vehicles;

and further comprising means for regulating and maintaining the water level in said clarifier tank at a level above said open end of said outlet tube whereby cleaned water is always available for pumping by said second pump means to said spray means.

2. The vehicle wash system of claim 1 wherein said means for regulating the water level in said clarifier tank controls the operation of said first pump means to pump water through said separator means into said clarifier tank.

3. The vehicle wash system of claim 1 wherein said means for regulating the water level in said clarifier tank includes a pair of vertically spaced water level sensors in said clarifier tank.

4. The vehicle wash system of claim 3 wherein said water level sensors and said open end of said outlet tube are located in said upper portion of said clarifier tank.

5. The vehicle wash system of claim 1 wherein said separator means comprises a cyclone separator.

6. The vehicle wash system of claim 1 wherein said settling pit includes a discharge pipe for delivering water from said settling pit to said first pump means from an upper portion of said pit whereby at least a portion of the solids in the wash water are allowed to settle in said pit and remain at the bottom thereof.

7. The vehicle wash system of claim 6 further comprising a secondary settling pit having an overflow tube therein for regulating a maximum fluid level therein, said secondary settling pit receiving wash water from said discharge pipe and delivering wash water towards said separator means.

8. The vehicle wash system of claim 7 further comprising a tertiary settling pit receiving wash water from said secondary settling pit via a second discharge pipe, said tertiary settling pit further providing a foot valve and intake screen for drawing partially cleaned water which is delivered towards said separator means.

* * * * *